(12) United States Patent
Zamuner

(10) Patent No.: US 7,544,914 B2
(45) Date of Patent: Jun. 9, 2009

(54) FUME GUN

(75) Inventor: Frank Zamuner, Oakville (CA)

(73) Assignee: Lincoln Global, Inc., Monterey Park, CA (US)

( * ) Notice: Subject to any disclaimer, the term of this patent is extended or adjusted under 35 U.S.C. 154(b) by 0 days.

(21) Appl. No.: 11/102,912

(22) Filed: Apr. 8, 2005

(65) Prior Publication Data

US 2006/0226136 A1    Oct. 12, 2006

(51) Int. Cl.
B23K 9/00    (2006.01)
(52) U.S. Cl. .................................. 219/137.41
(58) Field of Classification Search ............ 219/137.41, 219/137.9
See application file for complete search history.

(56) References Cited

U.S. PATENT DOCUMENTS

| | | | | |
|---|---|---|---|---|
| 3,798,409 A | * | 3/1974 | Troyer et al. ............ | 219/137.41 |
| 3,980,860 A | * | 9/1976 | Howell et al. ........... | 219/137.41 |
| 4,016,398 A | * | 4/1977 | Herrick .................. | 219/137.41 |
| 4,057,705 A | * | 11/1977 | Cockrum et al. ....... | 219/137.41 |
| 4,095,080 A | * | 6/1978 | Ueyama et al. ............... | 219/74 |
| 4,496,823 A | * | 1/1985 | Mann ..................... | 219/137.41 |
| 5,054,521 A | * | 10/1991 | Hendrick ................ | 137/625.31 |
| 5,079,404 A | | 1/1992 | Zamuner | |
| 5,313,046 A | | 5/1994 | Zamuner | |
| 5,491,321 A | * | 2/1996 | Stuart et al. ............ | 219/137.61 |
| 6,610,963 B2 | | 8/2003 | Zamuner | |
| 2004/0031781 A1 | | 2/2004 | Zamuner | |

FOREIGN PATENT DOCUMENTS

| | | | |
|---|---|---|---|
| CA | 2053131 | | 4/1992 |
| CA | 2106837 | | 3/1994 |
| CA | 2139152 | | 7/1995 |
| CA | 2338949 | | 8/2004 |
| EP | 0 502 421 A2 | * | 9/1992 |
| EP | 502421 A2 | * | 9/1992 |
| EP | 0 590 728 A1 | | 6/1994 |
| GB | 2 214 598 A | | 6/1989 |
| GB | 2 285 404 A | | 12/1995 |
| JP | 5-138357 | * | 6/1993 |
| JP | 05138357 A | * | 6/1993 |
| JP | 05138358 A | * | 6/1993 |
| JP | 05138359 A | * | 6/1993 |
| JP | 07266052 A | * | 10/1995 |

* cited by examiner

*Primary Examiner*—Kevin P Kerns
(74) *Attorney, Agent, or Firm*—Hahn Loeser + Parks LLP

(57) ABSTRACT

A torch for use in welding operations during which smoke and/or fumes are created has a nozzle and a handle connected to a conduit extending between the handle and the nozzle. A fume extraction duct extends from the nozzle and through the handle. An annular member surrounds the axial end of the nozzle and has a plurality of openings oriented such that fumes and ambient air are extracted in a direction substantially parallel to the longitudinal axis of the nozzle. A switch is provided to control fume extraction between a full flow rate and a partial flow rate.

20 Claims, 4 Drawing Sheets

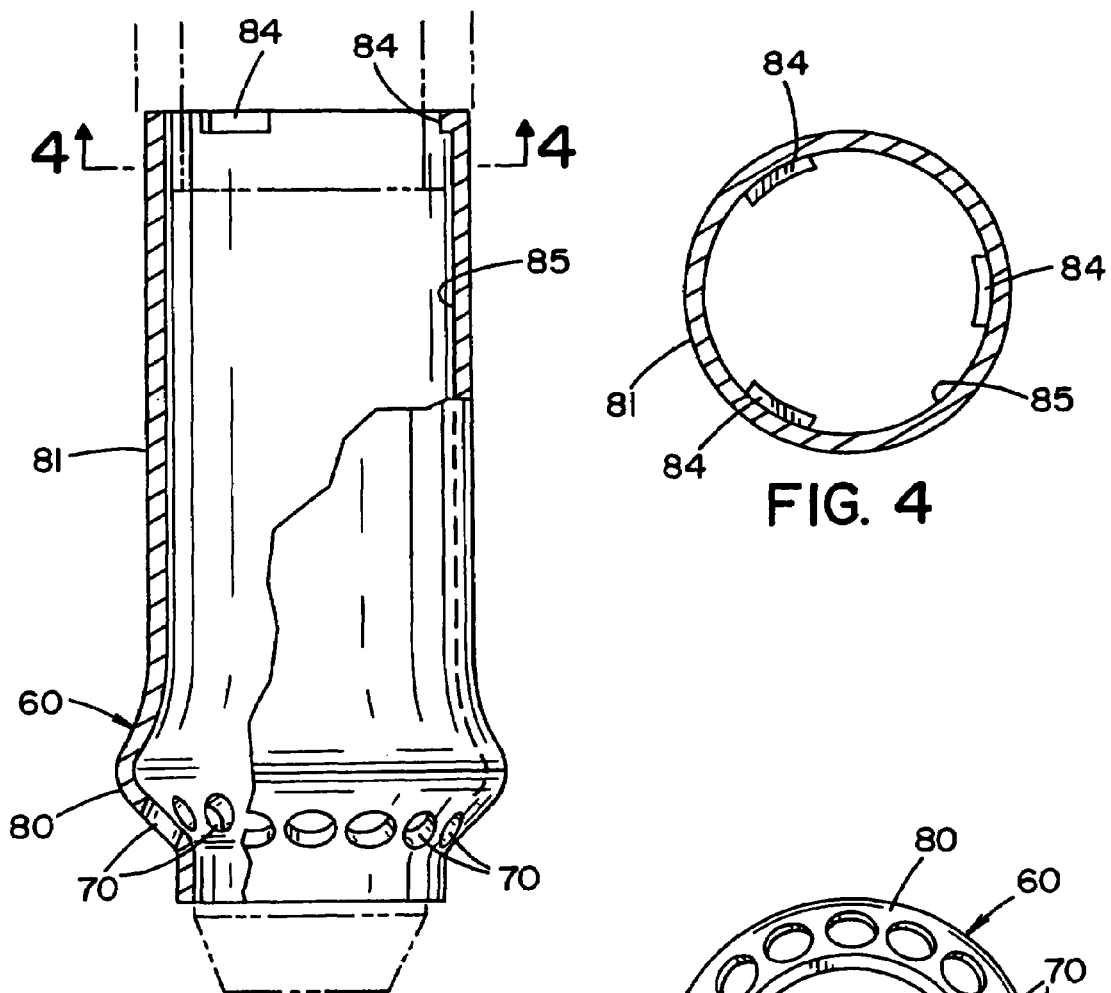
FIG. 3
FIG. 4
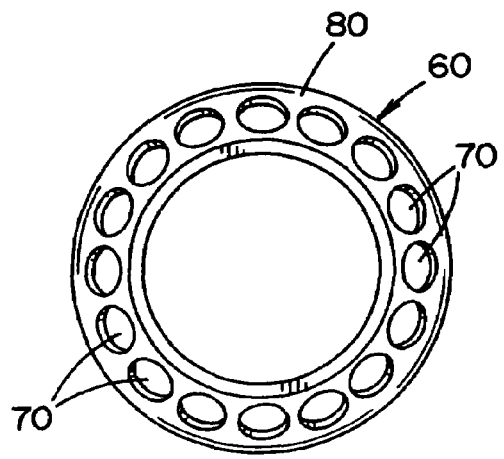
FIG. 5

FUME GUN

BACKGROUND

During welding or cutting, especially of metallic parts, gases and solid material are generated which not only tend to obstruct the operators vision, but also tend to cause visual and respiratory discomfort. This is especially true when welding or cutting in confined areas, such as assembly lines in factories, where several such operations may be in progress simultaneously.

One difficulty encountered in existing fume extracting torches is in the size and weight of the torch employing such a fume extracting device, and the fact that a large nozzle will interfere with the operator's view. An example of a previous attempt to incorporate a fume extracting device with a hand held welding torch is found in U.S. Pat. No. 3,980,860 which is hereby incorporated by reference.

Another difficulty is in the fact that the fume extracting passageways of existing devices get very hot due to the heat of the fumes drawn away from the weld. This heat causes the fume carrying conduits to deteriorate, and if these conduits are carried by the gun, then the gun handle becomes hot and uncomfortable to handle. If the fume extracting conduit is not carried in the handle, then the torch and associated cables and conduits become unwieldy and cumbersome. Another difficulty, especially where the torch is a welding gun, is in the interference of the fume extracting nozzle with any shielding gas which might be used.

Another problem with existing fume extracting nozzles is that the nozzles are not efficient at extracting ambient air and fumes from the work surface. The openings are not oriented and arranged so that a maximum amount of ambient air and fumes are extracted.

Thus, it is desirable to provide a fume extracting device in combination with a welding torch handle which has a more efficient method of extracting fumes and ambient air from a work surface.

SUMMARY OF THE INVENTION

In accordance with one aspect of the present invention, this invention relates to an improved hand held torch for welding or cutting including a nozzle designed to remove smoke and fumes in which a fume extracting conduit is carried within the torch handle.

Specifically, according to one aspect of the invention, a fume extracting conduit is formed as an integral part of the torch handle, and this conduit, along with the smoke and fumes carried thereby, are cooled sufficiently to prevent rapid deterioration of the conduit and heating of the handle to the extent that it will become uncomfortable to the operator. In the preferred embodiment of the invention, cooling of the conduit and fumes include mixing sufficient ambient air with the welding fumes. This ambient air, in combination with the positioning of the smoke and fume extracting orifice on the nozzle but away from the area of the weld or cutting operation allows the temperature of the handle to be maintained within acceptable limits.

In the embodiment of the invention, the torch handle and associated cables can be made of smaller and lighter material than used in prior art devices, and have a long life since the temperature of these materials is maintained within the handle. An easy to manipulate, hand held torch is provided.

Thus, in accordance with another aspect of the invention, a torch for use in welding operations during which smoke and/or fumes are created includes a nozzle which has a longitudinal axis and an axial end adjacent which welding occurs. The nozzle has a wire electrode, terminating in an arc tip. A handle is connected to a conduit extending between the handle and the nozzle and through the handle. A fume extraction duct extends from the nozzle and through the handle. An annular member surrounds the axial end of the nozzle. The annular member has at least one opening oriented such that fumes and ambient air are extracted in a direction substantially parallel to the longitudinal axis of the nozzle.

In accordance with another aspect of the invention, a nozzle for a welding torch used during welding operation during which smoke and/or fumes are created has an opening through which welding wire is inserted. A fume extraction duct extends through the nozzle adjacent the opening. An annular ring surrounds an axial end of the nozzle. The annular ring has a plurality of openings, wherein the openings are oriented such that fumes and ambient air are extracted in a direction substantially parallel to the longitudinal axis of the nozzle.

In accordance with another aspect of the invention, a nozzle for a welding torch used during a welding operation during which smoke and/or fumes are created has a switch which controls fume extraction flow between a full flow rate and a partial flow rate by activating a valve.

Accordingly, it is an aspect of this invention to provide an improved hand held torch in which a smoke and fume extracting nozzle is employed to draw fumes from the area of a welding or cutting operation and in which a fume carrying conduit is formed as an integral part of the torch handle; and to provide an improved torch of the type described wherein the handle of the torch is cooled so that the heat from the welding or cutting operation will not deteriorate the materials used in the gun and will not cause discomfort to the operator.

Another aspect of the invention is to provide a nozzle for the welding torch which efficiently draws ambient air and fumes into the nozzle and cools the fumes.

Other aspects of the invention will become apparent to those skilled in the art upon a reading and understanding of the following detailed description.

BRIEF DESCRIPTION OF THE DRAWINGS

FIG. 3 is an enlarged view taken in partial cross-section, of a welding gun nozzle shown in FIG. 2;

FIG. 4 is a cross sectional view taken along line 4-4 of FIG. 3;

FIG. 5 is a bottom plan view of the nozzle of FIG. 4; and

DETAILED DESCRIPTION

Figure 1:
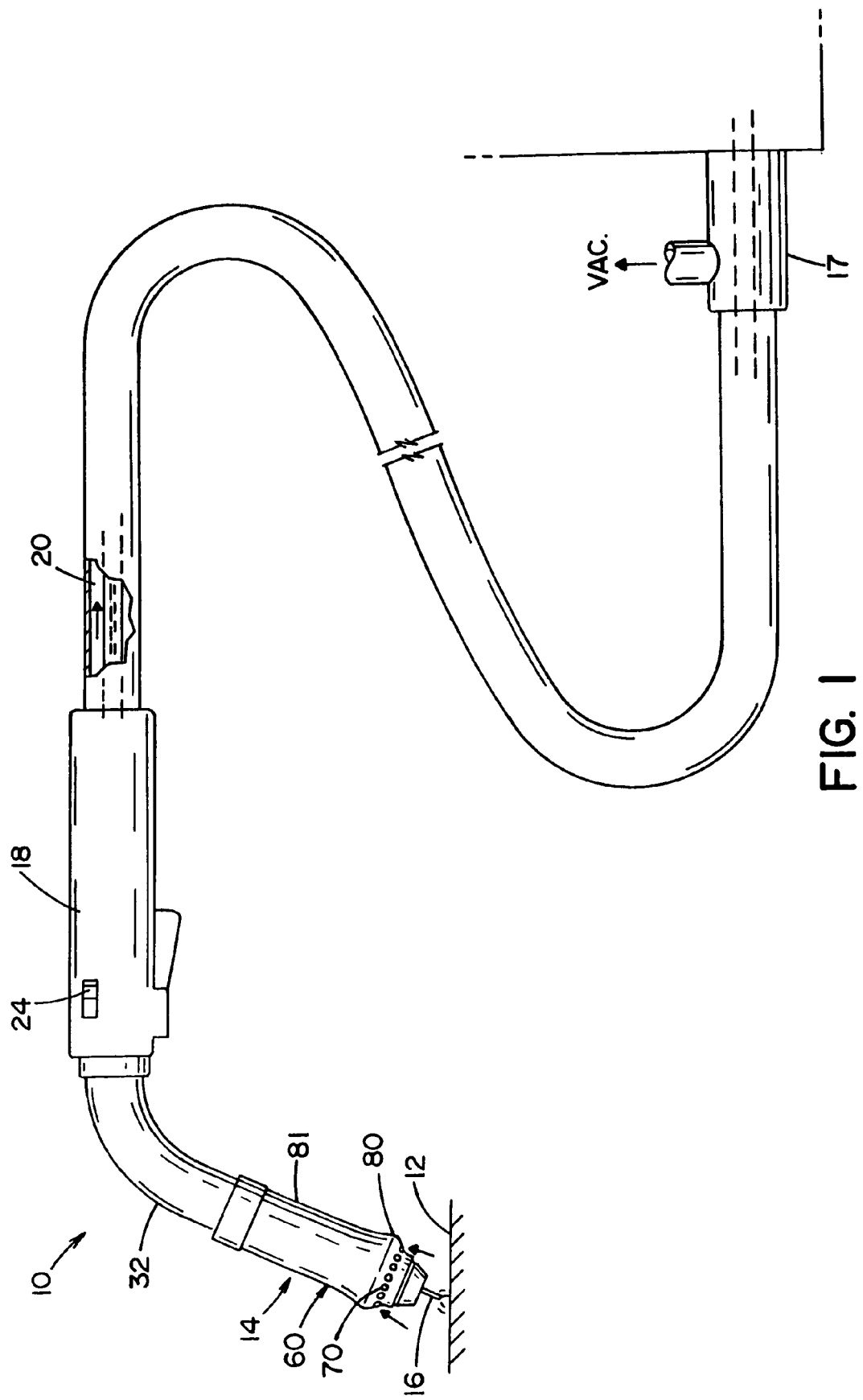
FIG. 1 is a schematic view of a welding torch, and fume gun assembly connected to a vacuum source in accordance with a preferred embodiment of the present invention.

Reference is now made to the drawings which show the preferred embodiments of the invention, and particularly to FIG. 1 which is a schematic view of a welding system in accordance with a preferred embodiment of the present invention. While the invention will be described herein with reference to gas shielded welding guns or torches, it is to be understood that this invention can also apply to MIG and TIG welding torches as well as to cutting torches.

Referring to FIG. 1, a welding torch 10 is shown in position above a workpiece 12 which is typically connected by means of a ground wire to a welding power supply (not shown). The welding torch 10 is typically supplied with wire 16 from a wire supply reel via a control system 17. The control system not only regulates the rate at which welding wire 16 moves into the torch, but it can also regulate the flow of shielding gas from a gas source.

Figure 6:
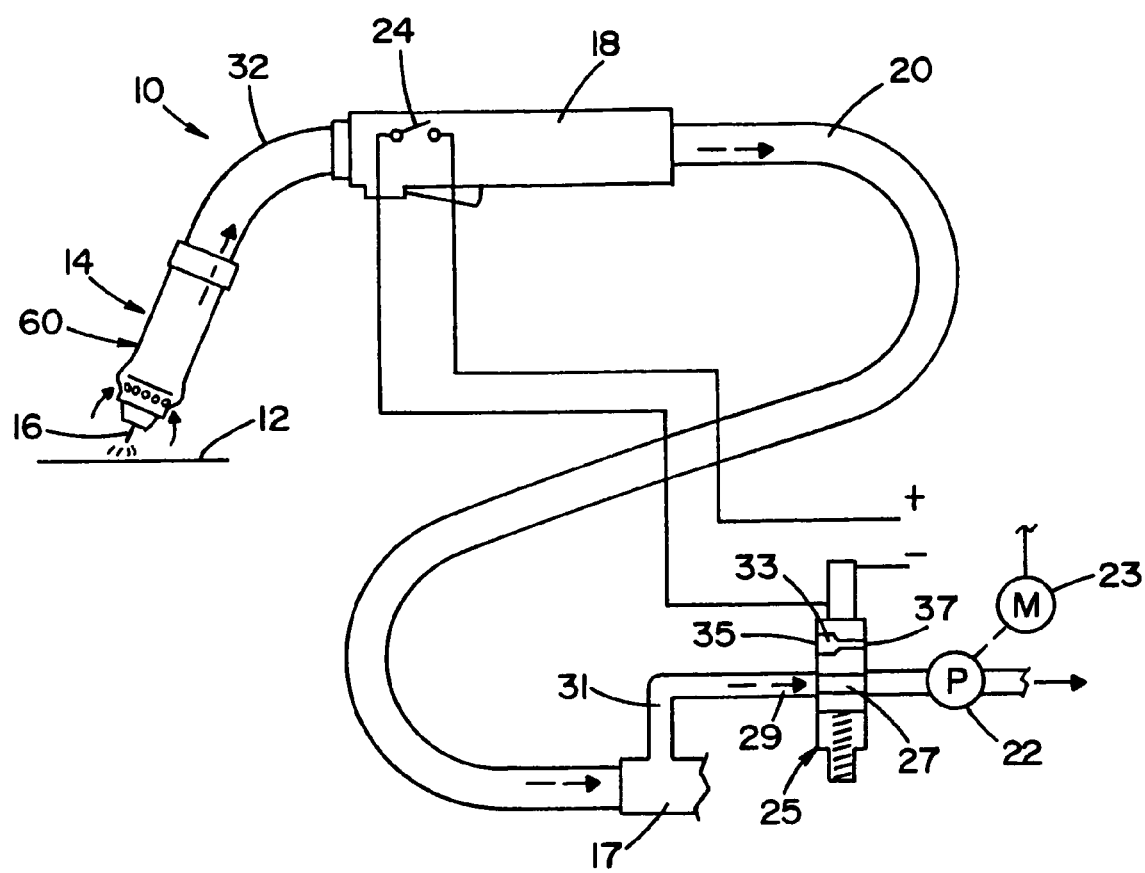
FIG. 6 is schematic view of a welding torch and fume gun assembly welding power supply and fume extracting pump assembly.

The welding torch 10 includes a nozzle 14 having a fume extracting orifice connected to a passageway carried through a torch handle 18 and supply cable 20 to a vacuum pump 22 (FIG. 6). A switch 24 in the handle of the torch is also connected by wires running through the cable 20 to the control system 17. Referring now to FIG. 6, the switch 24 is used to control the amount of fumes and ambient air extraction between a full and a partial flow. The vacuum pump 22, operated by a motor assembly 23, draws the ambient air and fumes through the system.

When the switch 24 is in the off position, as shown in FIG. 6, a valve assembly 25, such as a solenoid valve, is positioned so that an opening 27 in the valve is aligned with opening 29 in tube or conduit 31. Opening 27 allows a full flow of fumes and ambient air through the system. If a reduced flow rate is desired, the switch is depressed to an on position, which moves the valve 25 to a lower position, aligning smaller opening 33 of the valve with opening 29 of tube 31.

Opening 33 has a first end 35 and a second end 37, wherein the first end has a larger diameter than the second end, which has a diameter approximately half of the diameter of the first end. Thus, the flow rate is essentially reduced by half through the system.

The handle 18 of the torch is of relatively small size, and since only a single cable 20 is used which carries all of the necessary cooling, control, power supply, and wire feeding conduits, a welding system is thereby provided which is convenient and easy to use and not unwieldy or cumbersome.

Figure 2:
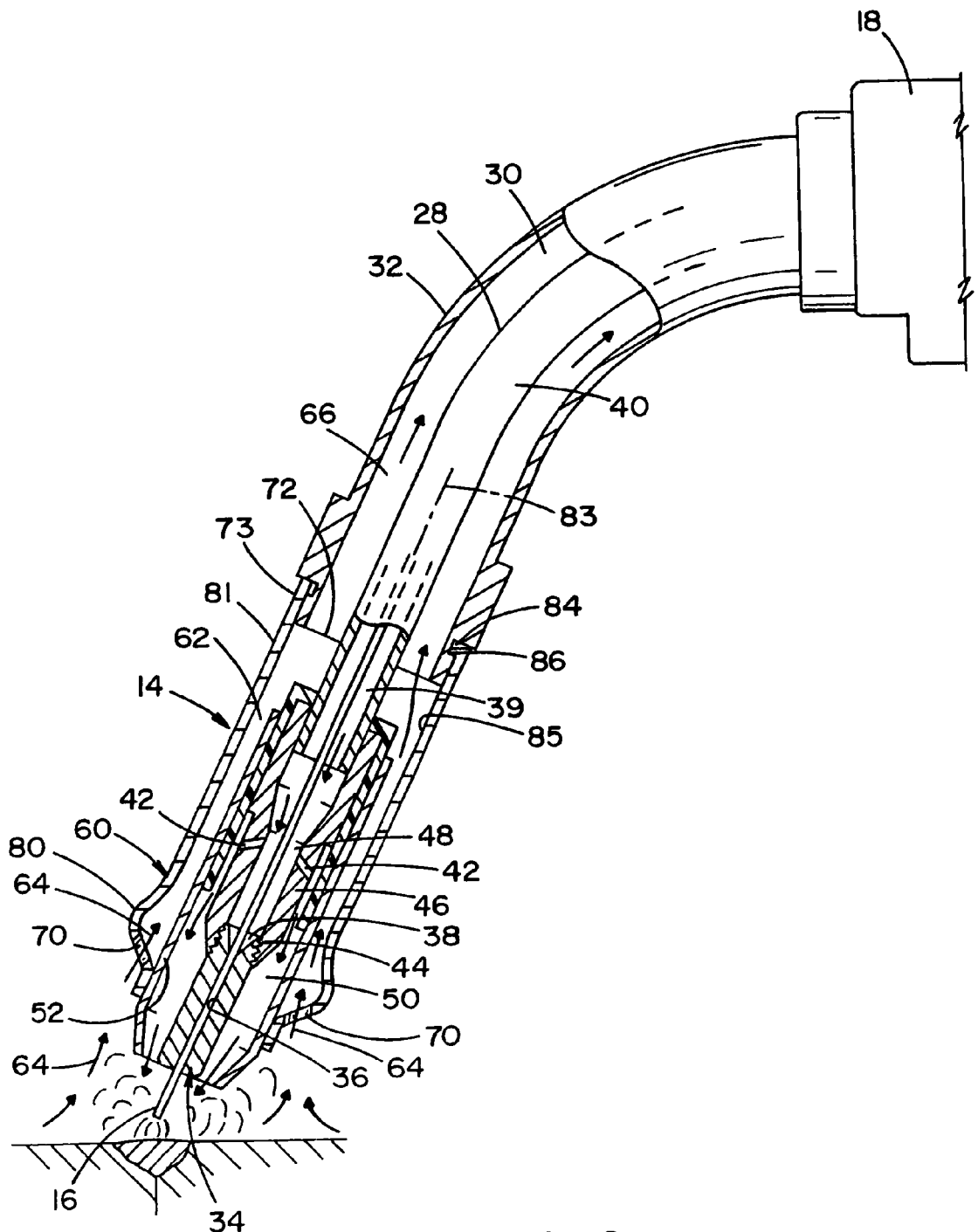
FIG. 2 is an elevational view, partly in cross section, of one embodiment of the invention wherein ambient air is mixed with the fumes drawn in by a welding torch nozzle to cause cooling thereof.

Referring now to FIG. 2 which illustrates the preferred embodiment of the invention, the welding torch 10 includes an inner conduit 28 through which shielding gas and welding wire are supplied. This conduit may also carry electrical control wires to handle mounted switch 24. The handle also carries a fume conduit 30 through which the fumes removed from the area of the weld are directed as they are drawn through the handle by the vacuum pump 22. Both the inner conduit 28 and the fume conduit 30 are surrounded by an outer casing 32.

The nozzle 14, shown in detail in FIG. 2, includes a contact tip 34 having formed therein a passageway 36 through which welding wire 16 is directed into the weld. At an upper end 38 of the contact tip the passageway opens up so that it has substantially the same diameter as the passageway 39 in wire guide tube 40. The contact tip 34 supplies substantially all of the electrical energy to the wire so that there will be practically no resistance heating of the welding wire 16 prior to its exiting the lower end of the contact tip.

The contact tip is received into and extends through a tapered opening 44 formed in a tip holder 46. The contact tip can also be tapered, and the outer surface of the contact tip and the opening 44 form an electrical contact so that electric current flowing through the inner conduit 28 will be carried to the welding wire. The tip holder 46 can include an internal thread which cooperates with an external thread on the wire guide tube 40 to cause the contact tip to firmly and positively engage the end of this tube. Between the end of the wire tube and the contact tip is formed a manifold 48 into which shielding gas from passageway 42 may flow and then be directed through a plurality of passageways 42 into a chamber 50 where the shielding gas is then directed over the weld. The chamber 50 is formed between the contact tip 34 and an insulating cylinder 52.

Outer shell 60 of the nozzle together with the outer cylindrical portion of the insulating cylinder 52 form a fume extracting passageway or chamber 62 into which the fumes generated by the weld may be drawn into the nozzle from the work surface in the direction shown by the arrows 64. This fume passageway extends upwardly into a passageway 66 in the gun formed between the guide tube 40 and exhaust jacket or outer casing 32. A plurality of orifices or openings 70 are formed between the lower end of the outer shell 60 and the cylinder 52 to extract ambient air and fumes from the work surface into the nozzle.

The fume chamber 62 is connected to the fume conduit or passageway 66 by means of an opening 72 located near an upper end 73 of the nozzle. As may be seen in FIG. 2, the wire guide tube 40 and outer casing 32 bends downwardly in a goose-neck shaped configuration from the handle 18. The opening 72 is located near this bend, and therefore the entrance to the fume conduit 66 is substantially axially aligned with the passageway 62. This will result in a substantially equal pressure existing completely round the circumferential extent of the openings 70 and will allow fumes to be drawn into the nozzle evenly from any location around the nozzle.

In the embodiment of the invention shown in FIG. 2, the size of the openings 70, the passageways 62 and 66, and the fume conduit 30 are so designed that, in combination with the capacity of the vacuum pump 22, sufficient ambient air is drawn into and mixed with the hot fumes removed from the welding area that the torch handle 18 is maintained at a temperature below that which would cause rapid deterioration of the gun materials or discomfort to the operator. Also, the openings 70 are so located axially on the nozzle that the fumes must travel upwardly and away from the weld and are therefore cooled somewhat prior to entering the openings 70. This combination therefore allows a welding gun to be constructed of a size which is convenient to use, since only one cable is attached thereto, and which provides for the efficient removal of smoke and fumes from the area of the weld.

As seen in FIGS. 3 and 5, in accordance with the preferred embodiment of the present invention, a plurality of spaced apart openings or orifices 70 are formed along the circumference of an annular ring 80 formed on outer shell 60. The ring 80 is formed by a portion of the nozzle which has a larger diameter and has rounded edges as compared to the diameter of the remaining portion 81 of the nozzle. The openings are shown to be circular; however, other shapes could be used without departing from the scope of the invention. The openings are shown to be equally spaced apart; however, other configurations could be used without departing from the scope of the present invention.

Referring to FIG. 2, the openings or apertures 70 are configured such that the ambient air is mixed with fumes from the welding procedure to be drawn into the fume chamber in a direction substantially parallel to a longitudinal axis 83 of the welding torch as shown by arrows 64. By orienting the openings this way, the air is drawn directly into the torch, thus increasing the efficiency with which the ambient air is used to cool the extracted fumes and the handle. The plurality of openings are shown to be closely spaced together to increase the amount of air and fumes that are extracted from the work area into the welding torch and fume gun.

Referring now to FIG. 4, the nozzle portion has a plurality of tabs 84 formed on an inner diameter 85 of nozzle portion 81 for interlocking the nozzle section onto mating slots 86 an end of the welding torch conduit or passageway 66. The nozzle tabs engage the slots and the nozzle can be rotated to easily lock and unlock the nozzle onto the end of casing 32.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A torch for use in welding operations during which smoke and/or fumes are created, said torch comprising:
    a nozzle having a longitudinal axis, an outer diameter portion and an axial end adjacent which welding occurs;
    said nozzle comprises a wire electrode, terminating in an arc tip;
    a handle connected to a conduit extending between said handle and said nozzle and through said handle;
    a fume extraction duct extending from said nozzle and through said handle; and
    an annular member having a portion with an outer diameter surrounding said axial end of said nozzle wherein said portion of said annular member is parallel to said outer diameter portion of said nozzle;
    said annular member comprising a flared wall portion extending radially outward from said axial end of said nozzle, said annular member flared wall portion having an outer diameter greater than said outer diameter of said annular member, said annular member comprising a plurality of openings formed on an outer surface of said flared wall portion outer diameter around a periphery of said annular member, said openings are oriented perpendicular to said longitudinal axis of said nozzle oriented such that fumes and ambient air are extracted directly into said annular member in a direction parallel to said longitudinal axis of said nozzle prior to entering said nozzle.

2. The torch of claim 1, further comprising a vacuum pump assembly connected via said conduit to said fume extracting duct and said nozzle.

3. The torch of claim 1, wherein said handle of said torch further comprises a switch for controlling operation of said torch.

4. The torch of claim 3, wherein said switch controls a fume extraction flow rate between full and partial flow.

5. The torch of claim 1, further comprising an outer wall surrounding said fume extraction duct and said conduit.

6. The torch of claim 5, further comprising a wire guide tube extending within said outer wall and through said nozzle.

7. The torch of claim 6, further comprising a manifold which comprises a plurality of gas passageways for directing shielding gas into the weld.

8. The torch of claim 7, further comprising a chamber formed at said axial end of said nozzle.

9. The torch of claim 1, further comprising a goose-neck shaped portion of said conduit formed between said handle and said nozzle.

10. The torch of claim 1, wherein said annular member forms a ring surrounding said axial end of said nozzle.

11. The torch of claim 1, wherein said openings are evenly spaced apart.

12. The torch of claim 1, wherein said openings are circular.

13. The torch of claim 1, wherein said nozzle comprises a second axial end, said second axial end comprises at least one tab formed on an inner diameter of said second axial end.

14. A torch for use in welding operations during which smoke and/or fumes are created, comprising:
    a nozzle having a longitudinal axis and an axial end adjacent which welding occurs;
    a duct found in said nozzle for extracting fumes from an associated work surface;
    a means for cooling said fumes, said means comprising an annular member having an outer diameter and a flared end wall having an outer diameter greater than said outer diameter of said annular member and a plurality of orifices oriented around said duct, and positioned on an outer surface of said flared end wall outer diameter perpendicular to said longitudinal axis of said nozzle; wherein said orifices extract fumes along with ambient air directly into said flared end wall, said orifices are oriented such that fumes and ambient air are extracted in a direction parallel to a longitudinal axis of said nozzle prior to entering said nozzle; and
    a vacuum pump which creates suction to extract said fumes and ambient air into said nozzle through said orifices.

15. A torch for use in welding operations during which smoke and/or fumes are created, said torch comprising:
    a nozzle having a longitudinal axis and an axial end adjacent which welding occurs;
    a fume extraction duct extending through said nozzle along said longitudinal axis;
    an annular ring comprising a body having an outer diameter and a flared end wall having an outer diameter which is greater than said outer diameter of said body and a plurality of orifices formed on an outer surface of said flared end wall outer diameter perpendicular to said nozzle longitudinal axis for extracting fumes and ambient air directly into said annular ring such that fumes and ambient air travel in a direction parallel to said longitudinal axis;
    a handle connected to said nozzle via a conduit; and,
    a switch mounted to said handle for controlling fume extraction flow rate between full and partial flow through said conduit.

16. The torch of claim 15, further comprising a valve connected to said switch, said valve having a first opening and a second opening spaced from said first opening, wherein said first opening is larger than said second opening.

17. The torch of claim 16, wherein said switch is in an off position, said valve first opening is aligned with said conduit extending from said handle and said nozzle, resulting in a full fume extraction flow rate.

18. The torch of claim 16, wherein when said switch is in an on position, said valve second opening is aligned with said conduit extending from said handle and said nozzle, resulting in a partial fume extraction flow rate.

19. The torch of claim 16, wherein said second opening has a first portion and a second portion having a diameter about half the diameter of said first portion.

20. The torch of claim 16, wherein said valve comprises a solenoid valve.

* * * * *